US012597359B2

(12) United States Patent
Berthier et al.

(10) Patent No.: US 12,597,359 B2
(45) Date of Patent: Apr. 7, 2026

(54) METHOD AND SYSTEM FOR GENERATING AND PROVIDING DESCRIPTORS OF METEOROLOGICAL OBSTACLES

(71) Applicant: Airbus Operations SAS, Toulouse (FR)

(72) Inventors: Jean-Baptiste Berthier, Toulouse (FR); Thibault Molinier, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 78 days.

(21) Appl. No.: 18/616,767

(22) Filed: Mar. 26, 2024

(65) Prior Publication Data

US 2024/0331554 A1 Oct. 3, 2024

(30) Foreign Application Priority Data

Mar. 28, 2023 (FR) ...................................... 2302918

(51) Int. Cl.
*G08G 5/76* (2025.01)
*G01S 13/95* (2006.01)
*G08G 5/21* (2025.01)

(52) U.S. Cl.
CPC .............. *G08G 5/76* (2025.01); *G01S 13/953* (2013.01); *G08G 5/21* (2025.01)

(58) Field of Classification Search
CPC .......... G08G 5/76; G08G 5/21; G01S 13/953
USPC ........................................................ 701/3
See application file for complete search history.

(56) References Cited

U.S. PATENT DOCUMENTS

| | | | | |
|---|---|---|---|---|
| 8,059,121 B2* | 11/2011 | McCullough | ........... | G06T 15/10 |
| | | | | 345/420 |
| 10,539,654 B1* | 1/2020 | Weichbrod | .............. | G01S 13/87 |
| 2009/0073165 A1 | 3/2009 | Mccullough | | |
| 2015/0170288 A1* | 6/2015 | Harton | ................... | G06Q 40/08 |
| | | | | 705/4 |
| 2015/0278596 A1* | 10/2015 | Kilty | ......................... | G06T 3/00 |
| | | | | 382/113 |
| 2020/0173809 A1* | 6/2020 | Turner | ..................... | G08G 5/55 |
| 2022/0350346 A1 | 11/2022 | Pastre et al. | | |

FOREIGN PATENT DOCUMENTS

EP 2040223 A1 3/2009

OTHER PUBLICATIONS

French Search Report for corresponding French Patent Application No. 2302918 dated Dec. 7, 2023.

* cited by examiner

*Primary Examiner* — Isaac G Smith

(74) *Attorney, Agent, or Firm* — Greer Burns & Crain Ltd.

(57) ABSTRACT

A weather data system in an aircraft which: processes georeferenced meteorological-obstacle data in order to categorize a weather severity of the meteorological obstacles and to obtain two-dimensional meteorological-obstacle images that are separated by weather-severity level; polygonizes through outline simplification the meteorological obstacles of the two-dimensional images, for each weather-severity level, in order to obtain polygons representative of the meteorological obstacles; and provides descriptors of meteorological obstacles to a flight management system of the aircraft, the descriptors describing georeferenced polygons; receives at least one requirement parameter representative of a requirement of the flight management system; and configures the polygonization and/or the data processing depending on the requirement.

12 Claims, 7 Drawing Sheets

100

200

AV  200

201

WDS

202

FMS

203

WSENS

204

DISP

205

TX/RX

301

CPU

302

RAM

303

ROM

304

HDD

305

COM

201

310

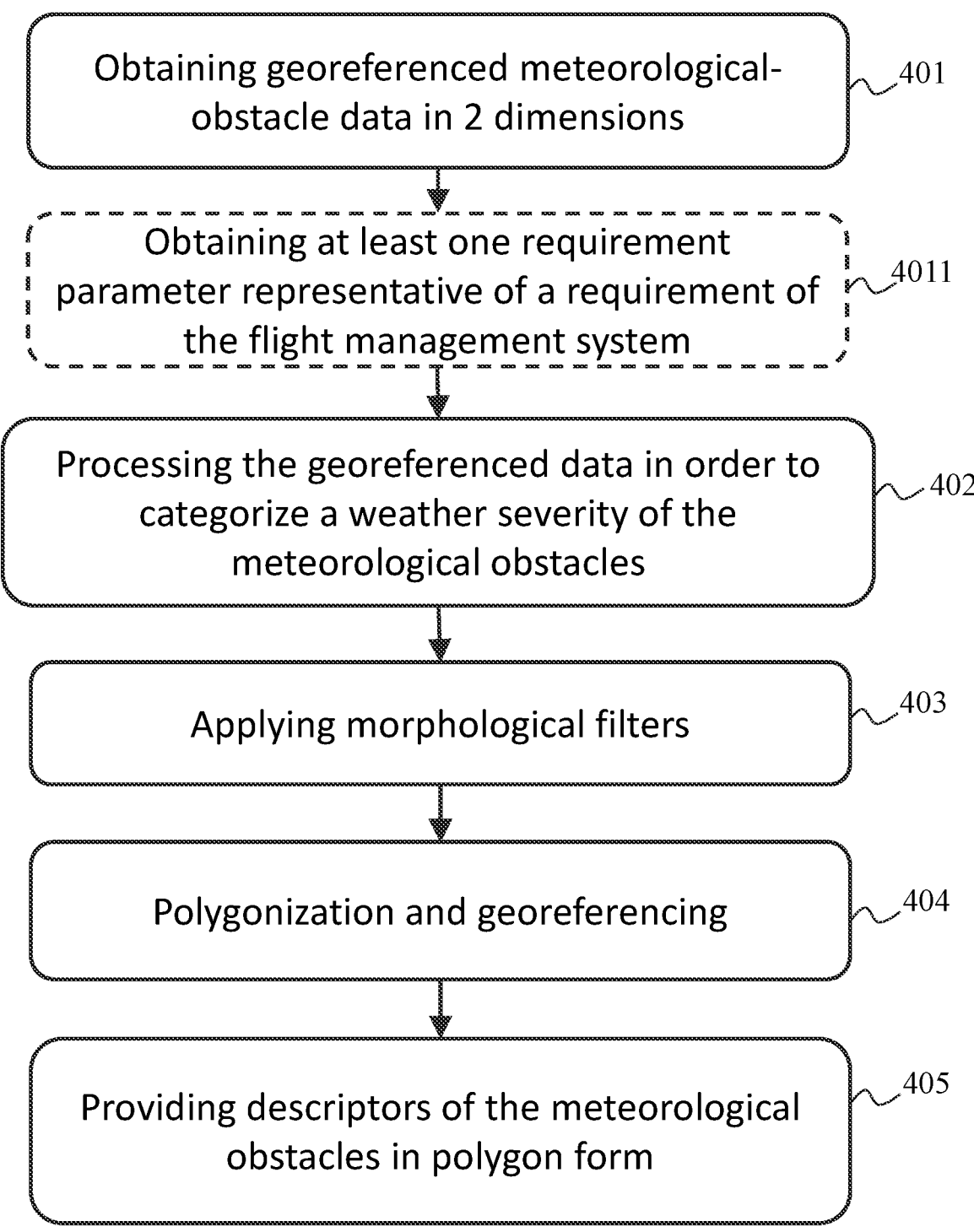

Obtaining georeferenced meteorological-obstacle data in 2 dimensions      401

Obtaining at least one requirement parameter representative of a requirement of the flight management system      4011

Processing the georeferenced data in order to categorize a weather severity of the meteorological obstacles      402

Applying morphological filters      403

Polygonization and georeferencing      404

Providing descriptors of the meteorological obstacles in polygon form      405

METHOD AND SYSTEM FOR GENERATING AND PROVIDING DESCRIPTORS OF METEOROLOGICAL OBSTACLES

CROSS-REFERENCES TO RELATED APPLICATIONS

This application claims the benefit of French Patent Application Number 2302918 filed on Mar. 28, 2023, the entire disclosure of which is incorporated herein by way of reference.

FIELD OF THE INVENTION

The present invention relates to a method for generating and providing descriptors of meteorological obstacles, in order to allow aircraft paths to be computed automatically. The present invention in particular relates to a weather data system configured to provide such descriptors of meteorological obstacles to a flight management system of an aircraft.

BACKGROUND OF THE INVENTION

When an aircraft is in flight, it may be desirable to provide assistance in order to automatically determine a path allowing meteorological obstacles to be avoided. This means the pilot of the aircraft does not have to determine by him or herself paths to avoid these meteorological obstacles (thunderclouds etc.).

However, weather data are typically obtained from weather radars and potentially other sensors located on board aircraft, and are complex data to manipulate because of their high precision (cloud shape etc.).

It would be desirable to provide a solution allowing assistance to be provided, with a view to automatically determining a path allowing meteorological obstacles to be avoided, while limiting the computational resources required to do so.

SUMMARY OF THE INVENTION

A method for providing descriptors of meteorological obstacles by means of a weather data system is thus provided here, the weather data system being located on board an aircraft, the weather data system comprising electronic circuitry implementing the following steps:

obtaining georeferenced meteorological-obstacle data;

processing the georeferenced meteorological-obstacle data in order to categorize a weather severity of the meteorological obstacles and to obtain two-dimensional meteorological-obstacle images separated by weather-severity level;

polygonizing through outline simplification the meteorological obstacles of the two-dimensional images, for each weather-severity level, in order to obtain polygons representative of meteorological obstacles, and georeferencing the obtained polygons; and providing the descriptors of meteorological obstacles to a flight management system of the aircraft, the descriptors describing the obtained georeferenced polygons.

The method further comprises the following steps:

receiving at least one requirement parameter transmitted by the flight management system, said at least one requirement parameter being representative of a requirement of the flight management system; and

configuring said polygonization and/or said data processing depending on said at least one requirement parameter.

Thus, fewer computational resources are employed by the flight management system to compute meteorological-obstacle-circumvention paths. Furthermore, it is possible for the flight management system to compute and select circumvention paths that meet its requirements.

According to one particular embodiment, the georeferenced meteorological-obstacle data are independently processed in two dimensions per altitude slice, and the method further comprises the following step:

reconstructing in three dimensions meteorological obstacles in polygon form per altitude slice.

According to one particular embodiment, the method further comprises the following step:

applying morphological filters to the images separated by weather-severity level, the morphological filters being a combination of a dilation operation followed by an erosion operation.

According to one particular embodiment, the method further comprises the following step:

adapting a ratio of a degree of dilation representative of the dilation operation and a degree of erosion representative of the erosion operation, depending on said at least one requirement parameter.

According to one particular embodiment, the adaptation of the ratio of the degree of dilation and degree of erosion corresponds to at least one among:

an increase with respect to a default value of said ratio when said at least one requirement parameter is representative of a requirement of the flight management system corresponding to a safety requirement of a flight of the aircraft or to a requirement in respect of the comfort of the passengers of the aircraft, a decrease with respect to a default value of said ratio when said at least one requirement parameter is representative of a requirement of the flight management system corresponding to a requirement to decrease a journey time.

According to one particular embodiment, the method further comprises the following step:

applying another filter aiming to remove, per weather-severity level, meteorological obstacles having an area smaller than a predetermined area threshold.

According to one particular embodiment, the method further comprises the following step:

adapting a value of the area threshold depending on said at least one requirement parameter.

According to one embodiment, the adaptation of said value of the area threshold corresponds to an increase with respect to a default value of said area threshold when said at least one requirement parameter is representative of a requirement of the flight management system corresponding to a resource and/or memory capacity of the flight management system or to the decrease in journey time.

According to one particular embodiment, at least one weather-severity level corresponds to an impact relating to the safety of the aircraft, and/or at least one weather-severity level corresponds to an impact relating to the performance of the aircraft.

According to one particular embodiment, the polygonization is carried out using a maximum distance dependent on a calibration parameter corresponding to one of said at least one requirement parameter.

According to one embodiment, the method further comprises the following step:

increasing with respect to a default value said maximum distance, when said at least one requirement parameter is representative of a requirement of the flight management system corresponding to the computational- and/or memory-resource capacity of the flight management system, decreasing with respect to a default value said maximum distance, when said at least one requirement parameter is representative of a requirement of the flight management system corresponding to the decrease in journey time or to a decrease in a fuel consumption and in an environmental impact.

According to one particular embodiment, the method further comprises the following step:

providing the descriptors of meteorological obstacles to a display of the aircraft.

A weather data system intended to be located on board an aircraft is also provided, the weather data system comprising electronic circuitry configured to implement the following steps:

obtaining georeferenced meteorological-obstacle data;

processing the georeferenced meteorological-obstacle data in order to categorize a weather severity of the meteorological obstacles and to obtain two-dimensional meteorological-obstacle images separated by weather-severity level;

polygonizing through outline simplification the meteorological obstacles of the two-dimensional images, for each weather-severity level, in order to obtain polygons representative of meteorological obstacles, and georeferencing the obtained polygons; and providing descriptors of meteorological obstacles, the descriptors describing the obtained georeferenced polygons.

The electronic circuitry is further configured to implement the following steps:

receiving at least one requirement parameter transmitted by the flight management system, said at least one requirement parameter being representative of a requirement of the flight management system; and configuring said polygonization and/or said data processing depending on said at least one requirement parameter.

An aircraft comprising a flight management system and the aforementioned weather data system is also provided, the latter being configured to provide the descriptors of meteorological obstacles to the flight management system, so that the flight management system is able to compute meteorological-obstacle-avoidance paths using said descriptors of meteorological obstacles.

BRIEF DESCRIPTION OF THE DRAWINGS

The abovementioned features of the invention, as well as others, will become more clearly apparent from reading the following description of at least one example of an embodiment, said description being given in relation to the appended drawings, in which:

FIG. 4A schematically illustrates an algorithm for providing meteorological obstacles in polygon form, in a first embodiment;

DETAILED DESCRIPTION OF THE PREFERRED EMBODIMENTS

Figure 1:
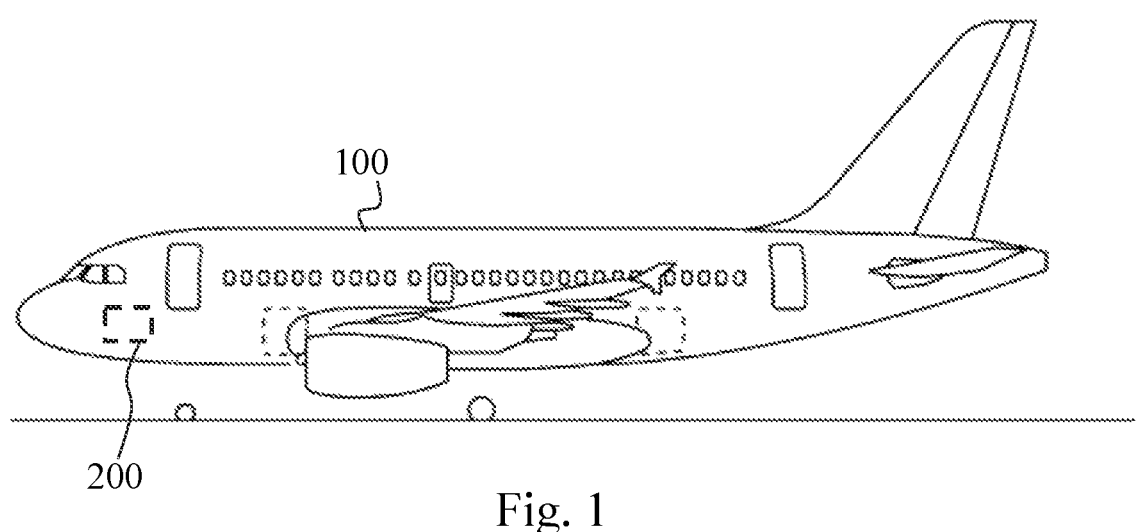
FIG. 1 schematically illustrates an aircraft seen from the side.

FIG. 1 schematically illustrates, seen from the side, an aircraft 100 equipped with avionics 200. The avionics 200 includes a flight management system FMS 202 configured to perform path computations.

To perform the path computations, the flight management system FMS 202 receives as input descriptors of meteorological obstacles (thunderclouds etc.) to be taken into account in the path computations of the aircraft 100. These descriptors of meteorological obstacles are provided to the flight management system FMS 202 by a weather data system WDS 201. The weather data system WDS 201 preferably provides these descriptors of meteorological obstacles to the flight management system FMS 202, and optionally to a display DISP 204 of the cockpit of the aircraft 100, with a predefined refresh period (or frequency) (for example, every minute).

The weather data system WDS 201 comprises a storage space for allowing a database to be formed in which the obstacle descriptors and any information useful for generating said obstacle descriptors are stored.

As detailed below, the descriptors of meteorological obstacles provided by the weather data system WDS 201 are georeferenced information in polygon form, preferably per altitude slice.

Figure 4B:
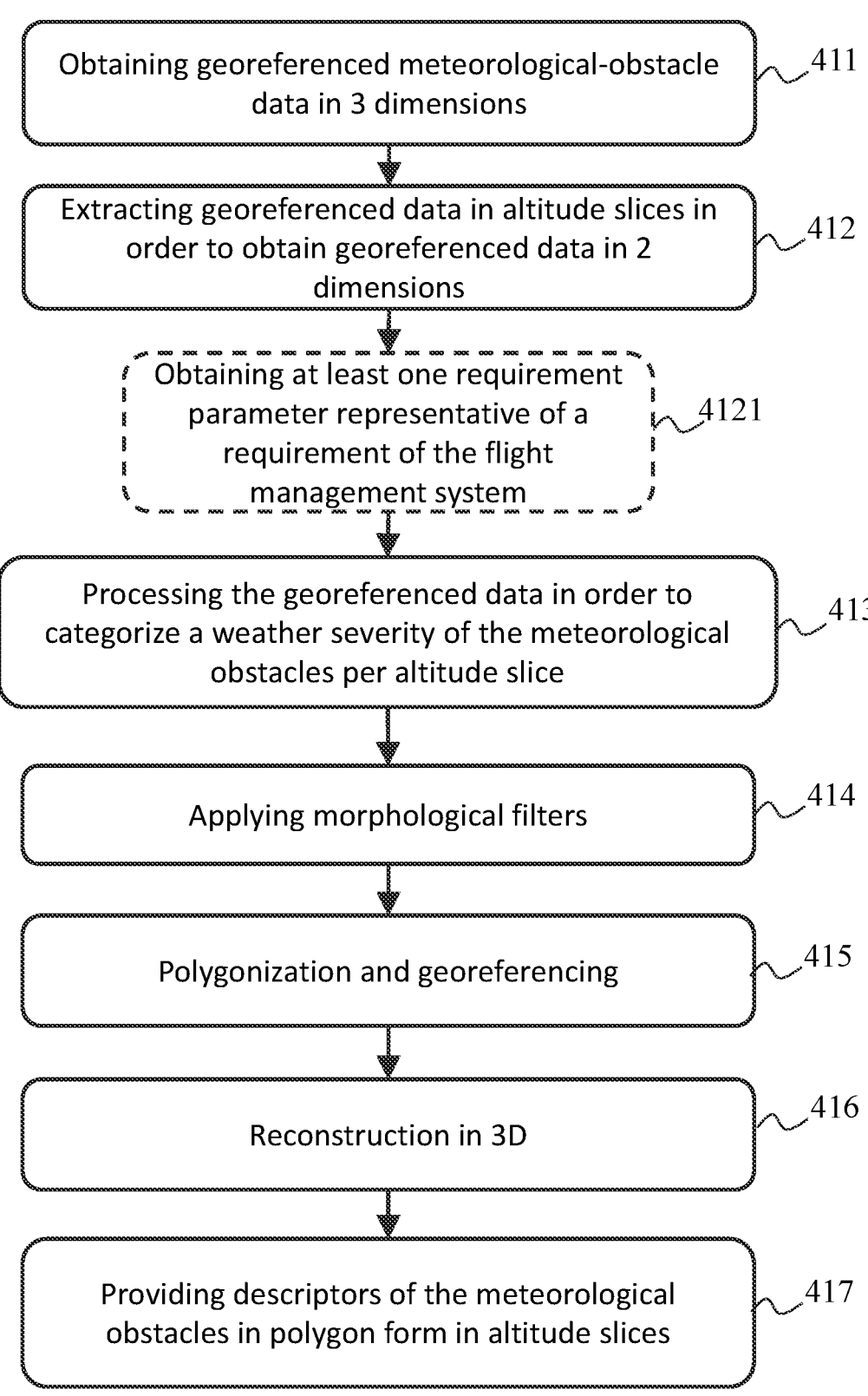
FIG. 4B schematically illustrates an algorithm for providing meteorological obstacles in polygon form, in a second embodiment.

The database of the weather data system WDS 201 is updated using weather data. These weather data are in 2 spatial dimensions (2D) (latitude, longitude), in which case the algorithm of FIG. 4A is implemented by the weather data system WDS 201 to generate the descriptors of meteorological obstacles, or in 3 spatial dimensions (3D) (latitude, longitude, altitude), in which case the algorithm of FIG. 4B is implemented by the weather data system WDS 201 to generate the descriptors of meteorological obstacles.

The weather data are for example reflectivity data, and possibly Doppler data (velocity data), derived from echoes of a weather radar located on board the aircraft 100, and typically from a map of reflectivity and possibly of Doppler data. Data obtained from other sensors on the aircraft 100 may be used as weather data.

The weather data system WDS 201 preferably obtains these weather data with a predefined refresh period (or frequency) (for example, every 30 seconds).

The database of the weather data system WDS 201 may be updated with additional weather data, for example descriptors of meteorological obstacles, in the form of georeferenced polygons, that were obtained (e.g. generated) on the ground and transmitted to the weather data system WDS 201 before the flight or during the flight.

For example, before takeoff, the database may be updated using an electronic flight bag (EFB). According to another example, the databases are updated by means of air-ground communications (AGC), for example with a data center of an airline. These two approaches may be combined, the databases being preloaded before takeoff and updated one or more times in flight, for example in order to take into account variations in meteorological conditions in real time.

If there were any contradiction in the weather data, the weather data obtained from measurements made using equipment located on board the aircraft 100 would take priority over said additional weather data.

Figure 2:
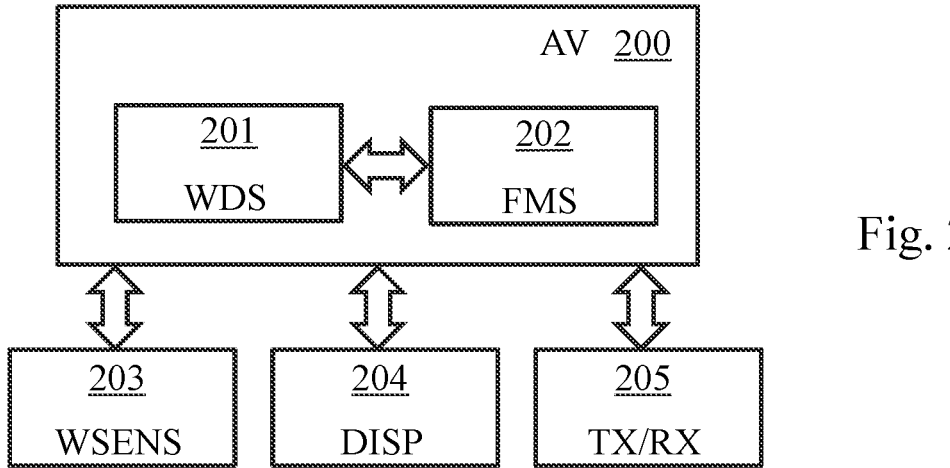
FIG. 2 schematically illustrates avionics comprising a weather data system.

An arrangement allowing the weather data system WDS 201 to obtain weather data in order to generate descriptors of meteorological obstacles representative of the meteorological conditions faced by the aircraft 100 in flight is schematically illustrated in FIG. 2.

In FIG. 2, the avionics 200 comprise, among other equipment, the weather data system WDS 201 and the flight management system FMS 202. The avionics 200 are configured so that the weather data system WDS 201 provides the flight management system FMS 202 with descriptors of meteorological obstacles in the form of georeferenced polygons. Using these polygons, the flight management system FMS 202 is able to compute meteorological-obstacle-avoidance paths while limiting the computational resources required to do so. Specifically, it is simpler to compute paths circumventing polygon vertices than to compute paths directly from images resulting from echoes of a weather radar or from other sensors of the aircraft 100.

In order to obtain the weather data used to form the polygons to be provided to the flight management system FMS 202, the weather data system WDS 201 interacts with weather sensors WSENS 203 (weather radar and possibly other sensors) of the aircraft 100.

To obtain the additional weather data, the weather data system WDS 201 may interact with a transceiver TX/RX 205, for example one implementing air-ground communications AGC.

In addition to providing polygons representative of meteorological obstacles to the flight management system FMS 202, the weather data system WDS 201 may provide polygons representative of meteorological obstacles to the display DISP 204. The polygons provided by the weather data system WDS 201 to the display DISP 204 may differ from the polygons provided by the weather data system WDS 201 to the flight management system FMS 202, because separate polygonization parameters may have been used to generate the polygons for the flight management system FMS 202 and for the display DISP 204.

Each polygon is defined by its edges and is preferably associated with an altitude slice defined by a floor altitude and a ceiling altitude. Therefore, each meteorological-obstacle descriptor corresponds to a polygon descriptor itself comprising edge descriptors including the following information:

longitude and latitude of one vertex of the edge,
longitude and latitude of the other vertex of the edge,
identifier of the edge within the polygon, and
preferably, identifier of the polygon to which the edge belongs.

Each polygon descriptor may thus be formed from consecutive edge descriptors, preferably listed in their order in the clockwise direction or in the anticlockwise direction around the perimeter of the polygon in question.

Each polygon descriptor further contains the following information:

timestamp,
polygon identifier,
floor altitude of the slice,
ceiling altitude of the slice, and
weather-severity level.

Each polygon descriptor may further contain the following information:

level of confidence in the weather data used to form the polygon, weather data obtained from an on-board weather radar for example being considered more reliable than weather data provided by a data center of an airline,
horizontal speed of the obstacle, with its direction of movement,
horizontal growth factor,
vertical growth factor,
floor altitude of the meteorological obstacle, and
ceiling altitude of the meteorological obstacle.

By virtue of the processing operations applied by the weather data system WDS 201 to the obtained weather data, the meteorological obstacles are each represented by one or more polygons (per altitude slice in question) of one or more respective weather-severity levels.

Figure 11A:
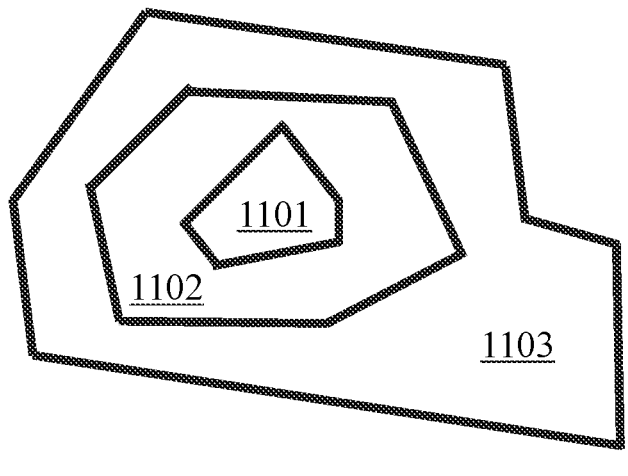
FIG. 11A schematically illustrates, seen in horizontal cross section, a meteorological obstacle represented in the form of polygons associated with various weather-severity levels.

For example, as schematically illustrated in FIG. 11A (view from above of the meteorological obstacle in 2 dimensions (2D), or horizontal cross section of the meteorological obstacle in 3 dimensions (3D)), a first polygon 1103 of low weather-severity level contains a second polygon 1102 of intermediate weather-severity level (which is therefore smaller in area) that itself contains a third polygon 1101 of high weather-severity level (which is therefore even smaller in area).

Figure 11B:
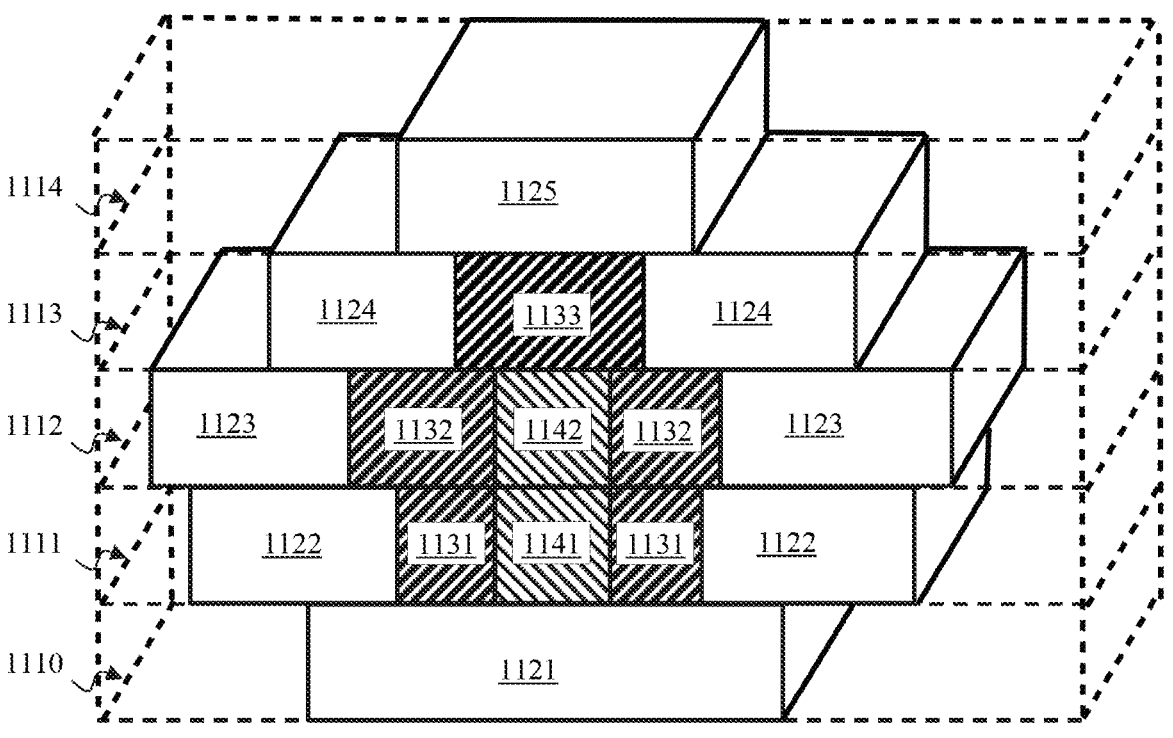
FIG. 11B schematically illustrates, seen in vertical cross section, a meteorological obstacle represented in the form of polygons associated with various weather-severity levels.

Considering a plurality of the altitude slices over which the meteorological obstacle extends, as schematically illustrated in FIG. 11B (vertical cross section of the meteorological obstacle in 3 dimensions (3D)), various weather-severity levels may appear within the same altitude slice (as in FIG. 11A) and from one altitude layer to another. FIG. 11B shows a succession of altitude slices of a meteorological obstacle, these slices being numbered from 1110 to 1114 in ascending order of altitude. The altitude slices 1110 to 1114 are of the same (predetermined) thickness, but may as a variant be of different thicknesses. Altitude slice 1110 contains a first polygon 1121 of low weather-severity level. Altitude slice 1111 contains a second polygon 1122 of low weather-severity level that contains a third polygon 1131 of intermediate weather-severity level, which itself contains a fourth polygon 1141 of high weather-severity level. Altitude slice 1112 contains a fifth polygon 1123 of low weather-severity level that contains a sixth polygon 1132 of intermediate weather-severity level, which itself contains a seventh polygon 1142 of high weather-severity level. Altitude slice 1113 contains an eighth polygon 1124 of low weather-severity level that contains a ninth polygon 1133 of intermediate weather-severity level. And lastly, altitude slice 1114 contains a tenth polygon 1125 of low weather-severity level.

Providing an indication of weather-severity level allows the flight management system FMS 202 to compute and select candidate paths for aircraft 100 while taking into account the circumstances of the flight. For example, when at a current flight altitude no other obstacle is present and the meteorological obstacle can be bypassed without excessive path deviation, the path computation may aim to completely circumvent the meteorological obstacle; when at a current flight altitude no other obstacle is present and the meteorological obstacle cannot be circumvented without excessive path deviation, the path computation may aim to avoid the portion of intermediate weather-severity level of the meteorological obstacle while permitting entry into the portion of low weather-severity level of the meteorological obstacle; and when at the current flight altitude a relief obstacle is present in the environment, the path computation may aim solely to ensure a safety margin between the aircraft 100 and, on the one hand, the portion of high weather-severity level of the meteorological obstacle and, on the other hand, the relief obstacle.

One example of a hardware platform suitable for implementing the weather data system WDS 201 is detailed below with reference to FIG. 3. Other equipment of the avionics 200, such as the flight management system FMS 202, may be based on such a hardware platform.

Figure 3:
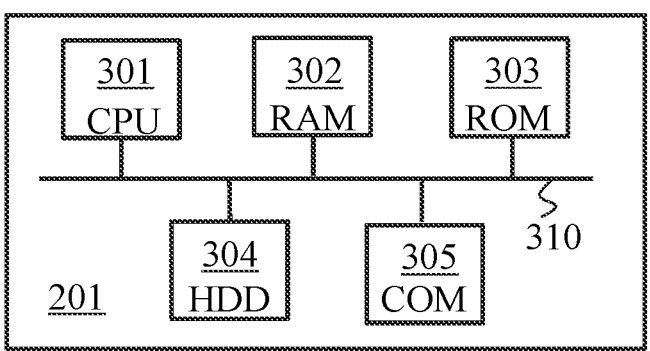
FIG. 3 schematically illustrates a hardware-platform layout suitable for implementation of the weather data system.

FIG. 3 schematically illustrates one example of a hardware architecture of the weather data system WDS 201, which then comprises, connected by a communication bus 310: a central processing unit CPU 301; a random-access memory RAM 302; a read-only memory ROM 303, for example a flash memory; a device for storing data, such as a hard disk drive HDD or a reader of a storage medium such as a reader of an SD card (SD standing for Secure Digital) 304; at least one communication interface 305 allowing the weather data system WDS 201 to interact with other electronic equipment of the aircraft 100, such as equipment of the avionics 200 (as schematically illustrated in FIG. 2).

The processor 301 is capable of executing instructions loaded into the RAM 302 from the ROM 303, from an external memory (not shown), from a storage medium such as an SD card, or from a communication network (not shown). When the weather data system WDS 201 is powered on, the processor 301 is capable of reading instructions from the RAM 302 and executing them. These instructions form a computer program that causes the processor 301 to implement the behaviors, steps and algorithms described here.

All or some of the behaviors, steps and algorithms described here may thus be implemented in software form by executing an instruction set by way of a programmable machine, such as a DSP (digital signal processor) or a microcontroller, or be implemented in hardware form by way of a machine or a dedicated component (chip) or a dedicated set of components (chipset), such as an FPGA (field-programmable gate array) or an ASIC (application-specific integrated circuit). Generally, the weather data system WDS 201, like other equipment of the avionics 200 (such as the flight management system FMS 202), comprises electronic circuitry arranged and configured to implement the behaviors, steps and algorithms described here.

FIG. 4A schematically illustrates an algorithm for providing meteorological obstacles in the form of georeferenced polygons, in a first embodiment. In this first embodiment, the polygons are generated from weather data in 2 spatial dimensions (2D). For example, these weather data correspond to meteorological obstacles at the same altitude as the current altitude of the aircraft 100, within a predetermined perimeter around the aircraft 100.

In a step 401, the weather data system WDS 201 obtains georeferenced data of meteorological obstacles in 2 spatial dimensions (2D). For example, the weather data system WDS 201 obtains georeferenced data of meteorological obstacles resulting from echoes of a weather radar located on board the aircraft 100 and possibly other sensors of the aircraft 100. For example, these georeferenced data take the form of one or more matrices in 2 spatial dimensions, in which each point indicates a reflectivity value and possibly a Doppler velocity value.

In a step 402, the weather data system WDS 201 applies processing to the obtained weather data, in order to categorize the weather severity of the meteorological obstacles and to obtain two-dimensional meteorological-obstacle images (top views) separated by weather-severity level.

At least two weather-severity levels are defined. Preferably, at least three weather-severity levels are defined. In one particular embodiment, three weather-severity levels are defined: low, intermediate, and high. Thus, for example, the low weather-severity level is defined for a reflectivity value between 20 dBZ and 30 dBZ, the intermediate weather-severity level is defined for a reflectivity value between 30 dBZ and 40 dBZ, and the high weather-severity level is defined for a reflectivity value above 40 dBZ.

Figure 5:
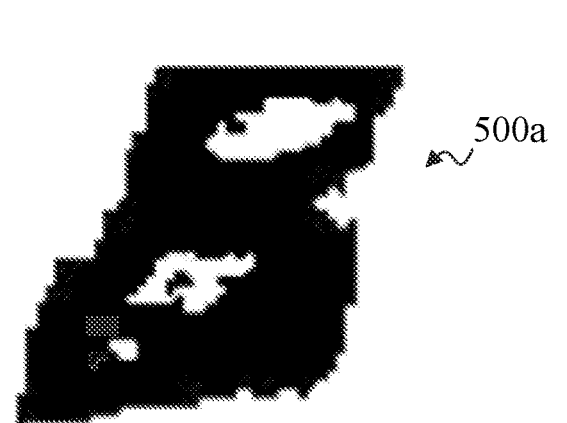
FIG. 5 shows a meteorological-obstacle image with three weather-severity levels.
Figure 5:
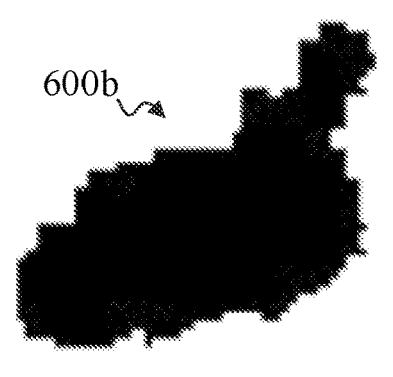

If all the weather-severity levels of the meteorological obstacles were represented on the same 2-dimensional (2D) image, an image such as as in FIG. 5 would be obtained. In FIG. 5, two meteorological obstacles 500a and 500b have been shown, with three weather-severity levels. The obstacles 500a and 500b respectively have outer black zones corresponding to the low weather-severity level, inner white zones (in the outer black zones) corresponding to the intermediate weather-severity level, and inner black zones (in the inner white zones) corresponding to the high weather-severity level.

In one particular embodiment, among the at least three defined weather-severity levels, at least one weather-severity level corresponds to a level of impact on the safety of the aircraft 100. It is thus possible for the flight management system FMS 202 to compute and select candidate paths for the aircraft 100 while taking into account said level of impact on the safety of the aircraft 100. Thus, for example, each severity level corresponds to a value representative of a respective impact on the safety of the aircraft 100 (for example, a level of mechanical stress undergone by the aircraft 100), and the flight management system FMS 202 defines candidate paths that circumvent meteorological obstacles having a weather-severity level higher than or equal to a predefined level of impact on the safety of the aircraft 100.

Alternatively or additionally, at least one weather-severity level corresponds to an impact on the performance of the aircraft 100 in terms of aerodynamics and/or environmental impact (i.e. fuel consumption, etc.). It is thus possible for the flight management system FMS 202 to compute and select candidate paths for the aircraft 100 while taking into account the impact of the meteorological obstacles on the performance of the aircraft 100. Thus, for example, each severity level corresponds to a value representative of a respective impact on the performance of the aircraft 100 (for example, a level of consumption of the aircraft 100), and the flight management system FMS 202 defines candidate paths that circumvent meteorological obstacles having a weather-severity level higher than or equal to a predefined level of impact on the performance of the aircraft 100.

Figure 6A:
FIG. 6A shows an extract of FIG. 5 providing a view of meteorological obstacles with a low severity level.
Figure 6B:
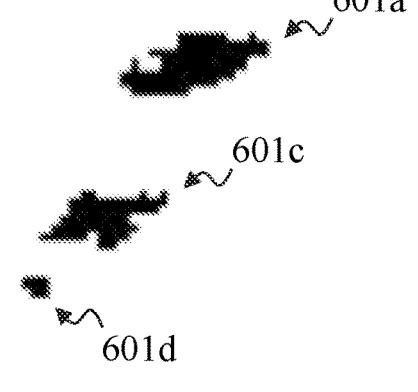
FIG. 6B shows an extract of FIG. 5 providing a view of meteorological obstacles with an intermediate severity level.
Figure 6B:
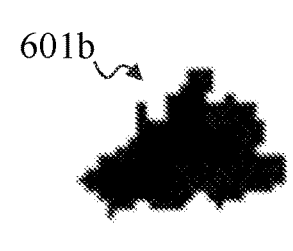
Figure 6C:
FIG. 6C shows an extract of FIG. 5 providing a view of meteorological obstacles with a high severity level.

In step 402, the weather data system WDS 201 separately processes the weather data depending on their weather-severity level (separate images). Thus, starting with the illustration of FIG. 5, the weather data system WDS 201 obtains a first separate image as illustrated in FIG. 6A corresponding to the low weather-severity level, a second separate image as illustrated in FIG. 6B corresponding to the intermediate weather-severity level, and a third separate image as illustrated in FIG. 6C corresponding to the high weather-severity level. In other words, FIG. 6A shows an extract of FIG. 5 providing an image of weather data having a low weather-severity level, FIG. 6B shows an extract of FIG. 5 providing an image of weather data having an intermediate weather-severity level, and FIG. 6C shows an extract of FIG. 5 providing an image of weather data having a high weather-severity level.

Thus, FIG. 6A shows meteorological obstacles 600a and 600b which correspond to the low weather-severity level extracted from the weather data; FIG. 6B shows meteorological obstacles 601a, 601b, 601c and 601d which correspond to the intermediate weather-severity level extracted from the weather data; and FIG. 6C shows meteorological obstacles 602a and 602b which correspond to the high weather-severity level extracted from the weather data.

Figure 7:
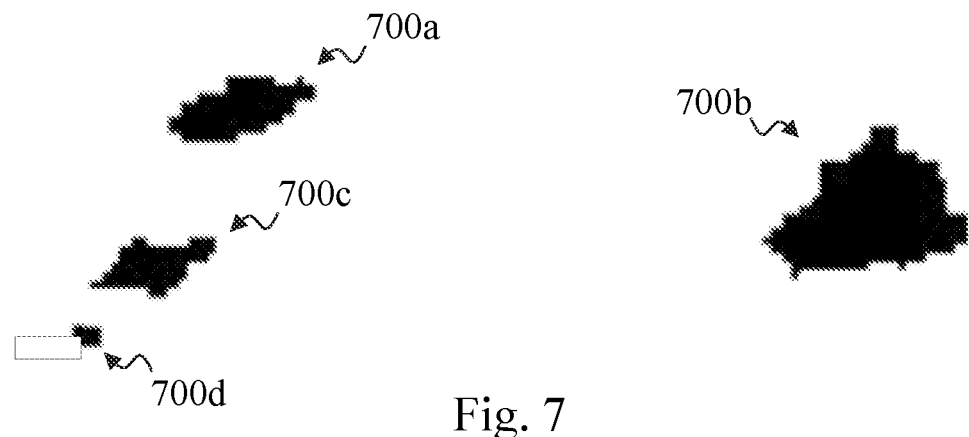
FIG. 7 shows a result of applying morphological filters to the meteorological obstacles of FIG. 6B.

In one particular embodiment, in a step 403, the weather data system WDS 201 applies morphological filters to each of the separate images. These morphological filters are a combination of an operation of dilation of the meteorological obstacles (per weather-severity level) followed by an operation of erosion of the dilated meteorological obstacles (per weather-severity level). According to one embodiment, a predetermined degree of dilation and a predetermined degree of erosion, which for example are identical, are respectively applied. These morphological filters make it possible to simplify, in a relatively conservative manner, the meteorological obstacles obtained for each weather-severity level. One example of application of such morphological filters to the meteorological obstacles 601a, 601b, 601c and 601d of FIG. 6B is illustrated in FIG. 7. Thus, meteorological obstacles 700a, 700b, 700c and 700d with simplified outlines are obtained from the meteorological obstacles 601a, 601b, 601c and 601d, respectively.

Figure 8:
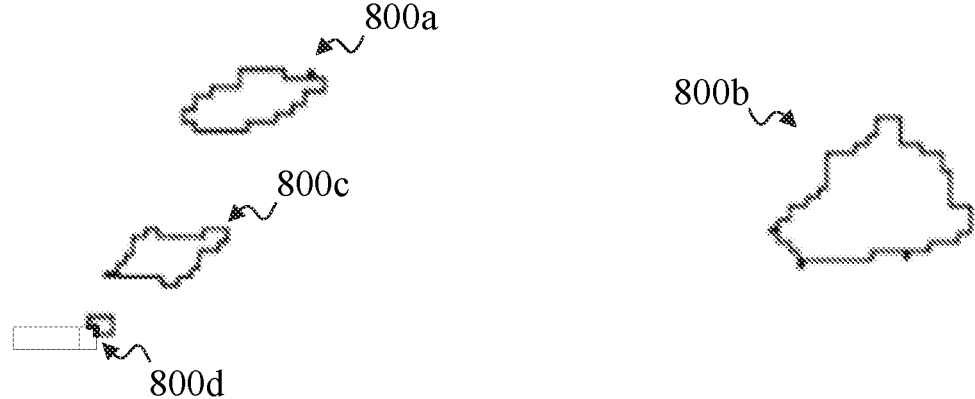
FIG. 8 shows a result of applying edge detection to the meteorological obstacles of FIG. 7.

The weather data system WDS 201 applies edge detection to the separate images in order to determine the outlines of the represented obstacles, as illustrated by the outlines 800a, 800b, 800c and 800d in FIG. 8, which were obtained from the meteorological obstacles 700a, 700b, 700c and 700d of FIG. 7, respectively. Alternatively, the edge detection may be applied before the morphological filters are applied.

Figure 9:
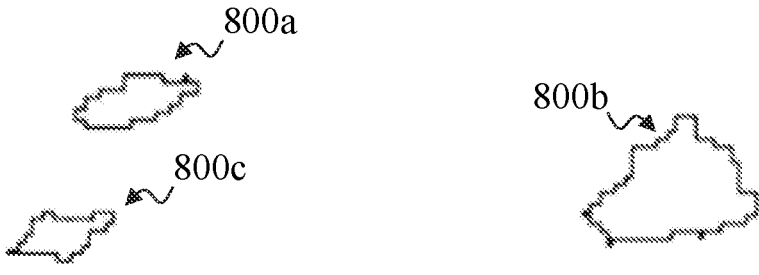
FIG. 9 shows a result of applying another filter to the meteorological obstacles of FIG. 8.
Figure 10:
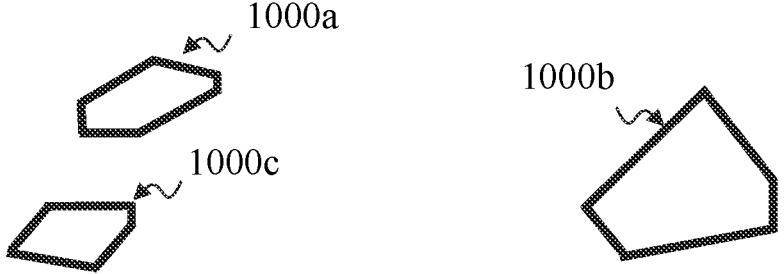
FIG. 10 shows a result of applying polygonization to the meteorological obstacles of FIG. 9.

In one particular embodiment, the weather data system WDS 201 applies another filter aiming to remove, per weather-severity level, meteorological obstacles having an area smaller than a predetermined area threshold. This other filter may be applied with different thresholds depending on the weather-severity level in question. For example, the higher the weather-severity level, the more conservative this other filter. One example of a result obtained with this other filter is illustrated in FIG. 9 in which, of the outlines 800a, 800b, 800c and 800d of FIG. 8, only the outlines 800a, 800b, 800c remain. It will be noted that the edge detection may, in another variant, be applied after application of this other filter aiming to remove meteorological obstacles having an area smaller than the predetermined area threshold.

In a step 404, the weather data system WDS 201 polygonizes the outlines of the meteorological obstacles obtained after application of the filters (if filters such as mentioned above were applied). The polygonization is an operation of outline simplification, with a predetermined maximum distance ε>0. The polygonization is performed for each weather-severity level.

The maximum distance ε defines the maximum permitted margin of error between the outline of each meteorological obstacle before polygonization and the outline of each meteorological obstacle after polygonization. The maximum distance ε may be set to various values depending on whether the meteorological-obstacle polygons are intended to be provided to the flight management system FMS 202 or to the display DISP 204. When the meteorological-obstacle polygons are intended to be provided to the flight management system FMS 202, the flight management system FMS 202 may provide a calibration parameter allowing the maximum distance ε to be set.

A Douglas-Peucker algorithm (also known as the Ramer-Douglas-Peucker algorithm) is for example used to carry out the polygonization, with a predetermined maximum distance ε>0. Other outline-simplifying algorithms may be used.

In one particular embodiment, the weather data system WDS 201 verifies whether, as a result of step 404, one or more polygons thus obtained are composed of less than three edges (polygons limited to a straight line segment). If such is the case, the weather data system WDS 201 deletes the one or more polygons in question.

Next, the weather data system WDS 201 georeferences the polygons thus obtained. In other words, the weather data system WDS 201 assigns spatial coordinates to the vertices of the constituent edges of the polygons obtained. The polygons are georeferenced based on the georeferencing of the weather data used to generate said polygons and on knowledge of the geometric transformations applied to the 2-dimensional images to achieve said polygons.

The weather data system WDS 201 may group the polygons, which are thus obtained per weather-severity level, by meteorological obstacle, as illustrated in FIG. 11A.

In a step 405, the weather data system WDS 201 provides the descriptors of meteorological obstacles, which describe the georeferenced polygons thus obtained, and potentially other meteorological-obstacle polygons delivered by the data center of an airline (possibly via the electronic flight bag or EFB), to the flight management system FMS 202. The weather data system WDS 201 may also provide the polygons thus obtained, and potentially other meteorological-obstacle polygons delivered by the data center of an airline (possibly via the electronic flight bag or EFB), to the display DISP 204.

In one particular embodiment, the weather data system WDS 201 also provides the polygon descriptors thus obtained to the data center of the airline (via the transceiver TX/RX 205) so that they may be shared with one or more other aircraft.

FIG. 4A schematically illustrates an algorithm for providing meteorological obstacles in polygon form in a 2-dimensional (2D) context; A 3-dimensional (3D) approach is schematically illustrated in FIG. 4B, in a second embodiment.

In a step 411, the weather data system WDS 201 obtains georeferenced data of meteorological obstacles in 3 spatial dimensions (3D). For example, the weather data system WDS 201 obtains georeferenced data of meteorological obstacles resulting from echoes of a weather radar located on board the aircraft 100 and possibly other sensors of the aircraft 100. For example, these georeferenced data take the form of one or more matrices in 3 spatial dimensions, in which each point indicates a reflectivity value and possibly a Doppler velocity value.

In a step 412, the weather data system WDS 201 extracts georeferenced data in altitude slices in order to obtain meteorological data in 2 dimensions (2D). Each altitude slice may thus be processed independently for polygonization purposes (the case is then that of FIG. 4A, for each altitude slice).

In the preceding example of matrices in 3 spatial dimensions resulting from echoes of a weather radar located on board the aircraft 100, it is possible for the resolution of the matrix to differ from the size of the altitude slices and thus for a given altitude slice to cover a number of index values of one dimension of said matrices. In this case, the highest reflectivity value is retained (the same going for the Doppler velocity value).

In a step 413, the weather data system WDS 201 separately processes the weather data depending on their weather-severity level (separate images), per altitude slice. The processing is thus applied independently for each altitude slice. For each altitude slice, step 413 is identical to step 402 already described above.

In a step 414, the weather data system WDS 201 applies morphological filters to each of the separate images. For each altitude slice, step 414 is identical to step 403 already described above.

In a step 415, the weather data system WDS 201 polygonizes the outlines of the meteorological obstacles obtained after application of the filters (if filters such as mentioned above were applied). The polygonization is performed for each weather-severity level and for each altitude slice. Thus, for each altitude slice, step 415 is identical to step 404 already described above.

In a step 416, the weather data system WDS 201 performs a reconstruction in 3 dimensions of the meteorological obstacles in polygon form per altitude slice. The weather data system WDS 201 georeferences the polygons thus obtained, this allowing the meteorological obstacles to be reconstructed in 3 dimensions.

The weather data system WDS 201 may then group the polygons, which are thus obtained per weather-severity level and per altitude slice, by meteorological obstacle, as illustrated in FIG. 11B (vertical cross section) and in FIG. 11B (horizontal cross section).

In a step 417, the weather data system WDS 201 provides the descriptors of meteorological obstacles, which describe the georeferenced polygons thus obtained, and potentially other meteorological-obstacle polygons delivered by the data center of an airline (possibly via the electronic flight bag or EFB), to the flight management system FMS 202. The weather data system WDS 201 may also provide the polygons thus obtained, and potentially other meteorological-obstacle polygons delivered by the data center of an airline (possibly via the electronic flight bag or EFB), to the display DISP 204.

In one particular embodiment, the weather data system WDS 201 also provides the polygon descriptors thus obtained to the data center of the airline so that they may be shared with one or more other aircraft.

According to one particular embodiment, in a step 4011 described with reference to FIG. 4A or in a step 4121 described with reference to FIG. 4B, the weather data system WDS 201 receives from the flight management system FMS 202 at least one parameter, called the "requirement parameter", representative of a requirement of the flight management system FMS 202.

The weather data system WDS 201 then configures the processing of the meteorological-obstacle data and/or the polygonization depending on the one or more obtained requirement parameters. To this end, the weather data system WDS 201 then adapts, depending on said at least one requirement parameter, the parameters of degree of dilation, degree of erosion, area threshold and/or maximum distance ε. In particular, the weather data system WDS 201 increases or decreases a value of the degree of dilation, degree of erosion, area threshold and/or maximum distance ε with respect to a default value of each of these parameters or with respect to a previous value of each of these parameters.

According to one particular embodiment, the weather data system WDS 201 adapts a ratio of the degree of dilation and degree of erosion of the morphological filters depending on the one or more requirement parameters transmitted by the flight management system FMS 202.

The requirement parameter is representative of one of the following requirements:

a requirement in respect of the flight safety of the aircraft 100. In one example, the flight management system FMS 202 computes and selects candidate paths for which flight safety has priority over another requirement, such as passenger comfort. In other words, the candidate paths avoid the polygons of highest weather-severity level, but pass through polygons of intermediate weather-severity level, even if this will cause passengers discomfort (e.g. turbulence). To this end, the weather data system WDS 201, during processing of the meteorological-obstacle data, applies morphological filters that have a degree of dilation/degree of erosion ratio higher than a default value (typically a nominal value). In other words, the weather data system WDS 201 favors dilation operations (i.e., operations with a degree of dilation higher than the degree of erosion) depending on the severity level of the polygons, a requirement in respect of the computational- and/or memory-resource capacity of the flight management system FMS 202. In one example, depending on the storage capacity of the flight management system FMS 202, the weather data server WDS 201 adapts, during the polygonization, the parameter of area threshold of the processing of the meteorological-obstacle data and/or the parameter of maximum distance $\xi$, in order not to overload the memory of the flight management system FMS 202 or in order not to excessively increase computation time. In particular, the weather data system WDS 201 increases the value of the area threshold and/or maximum distance ε with respect to default values (typically nominal values) in order to decrease the number of polygons and/or the number of sides that the polygons have, a requirement in respect of passenger or cargo comfort. For example, the flight management system FMS 202 computes and selects candidate paths for which passenger comfort takes priority over a fuel-consumption requirement. To this end, the candidate paths avoid all the polygons to limit, for example, the number of times turbulence is encountered. To this end, the weather data system WDS 201, during processing of the meteorological-obstacle data, applies morphological filters that have a degree of dilation/degree of erosion ratio higher than a default value (i.e., it favors dilation operations). Furthermore, the degree of dilation/degree of erosion ratio when a comfort requirement has priority will be higher than the predefined degree of dilation/degree of erosion ratio when a requirement to decrease fuel consumption has priority, a requirement in respect of decreasing journey time, or flight time, between the current position at the time of computation and selection of candidate paths by the flight management system FMS 202 and the destination of the aircraft 100. For example, the flight management system FMS 202 computes and selects candidate paths for which journey time is as short as possible. To this end, the candidate paths avoid only strictly necessary polygons (e.g., polygons with a high severity level) in order to limit journey time. To this end, the weather data system WDS 201 adapts the degree of dilation/ degree of erosion ratio to favor erosion operations (i.e., degree of erosion greater than the degree of dilation). In other words, the weather data system WDS 201 decreases the degree of dilation/degree of erosion ratio with respect to a default value (typically a nominal value). Furthermore, the weather data system WDS 201 increases the area threshold with respect to a default value (typically a nominal value), and decreases the maximum distance ε with respect to a default value (typically a nominal value).

a requirement in respect of fuel consumption and environmental impact. For example, the flight management system FMS 202 seeks to limit emissions of $CO_2$, NOx, condensation trails, etc. Alternatively or additionally, the flight management system FMS 202 seeks to save the fuel available to the aircraft 100. The paths computed, then selected are the shortest possible and therefore avoid certain polygons, but pass through others to save fuel. To this end, the weather data system WDS 201 decreases the parameter of maximum distance ε with respect to a default value (i.e., a more accurate polygon is obtained).

In order to be able to make the various adaptations (i.e. increase or decrease with respect to default values or previous values) of the above parameters, the weather data system WDS 201 receives a requirement parameter or a combination of requirement parameters representative of the requirements described above. It is thus possible for the weather data system WDS 201 to configure the processing of the meteorological-obstacle data and/or the polygonization of the meteorological obstacles so as to make it possible for the flight management system FMS 202 to compute and select candidate paths in accordance with the one or more requirements in question.

These requirements of the flight management system FMS may be predefined in light of the requirements (or objectives) of the airline managing the aircraft 100, then adapted during flight depending on the various conditions encountered.

According to one particular embodiment, the requirement parameter corresponds to the calibration parameter provided by the flight management system FMS 202 allowing the maximum distance ε to be set. In other words, the calibration parameter is representative of one of the requirements described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for determining a path allowing meteorological obstacles to be avoided by an aircraft, the method comprising:

transmitting, by a flight management system of the aircraft to a weather data system located on board the aircraft, at least one requirement parameter representative of a requirement of the flight management system;

providing descriptors of meteorological obstacles with the weather data system, the weather data system comprising electronic circuitry configured to implement the following steps:

receiving the at least one requirement parameter transmitted by the flight management system;

obtaining georeferenced meteorological-obstacle data;

processing the georeferenced meteorological-obstacle data in order to categorize a weather severity of meteorological obstacles and to obtain two-dimensional meteorological-obstacle images separated by weather-severity level;

polygonising, through outline simplification, meteorological obstacles of the two-dimensional images, for each weather-severity level, in order to obtain polygons representative of the meteorological obstacles, and georeferencing the obtained polygons;

configuring the processing, the polygonising, or both depending on the at least one requirement parameter; and providing descriptors of the meteorological obstacles to the flight management system, the descriptors describing the obtained georeferenced polygons; and wherein the method further comprises:

computing by the flight management system, a computed path allowing meteorological obstacles to be avoided by the aircraft; and guiding the aircraft according to the computed path, wherein the requirement of the flight management system is representative of:

a computational resource of the flight management system, or a memory resource capacity of the flight management system, or both; or a requirement of decreasing journey time, or flight time, between a current position of the aircraft at a time of computation of the computed path by the flight management system and a destination of the aircraft; or a requirement in respect of fuel consumption and environmental impact; or any combination thereof.

2. The method according to claim 1, wherein the georeferenced meteorological-obstacle data are independently processed in two dimensions per altitude slice, and wherein the method further comprises:

reconstructing in three dimensions meteorological obstacles in polygon form per altitude slice.

3. The method according to claim 1, further comprising:
applying morphological filters to the images separated by
weather-severity level, the morphological filters com-
prising a combination of a dilation operation followed
by an erosion operation.

4. The method according to claim 3, further comprising:
applying another filter configured to remove, per weather-
severity level, meteorological obstacles having an area
smaller than a predetermined area threshold.

5. The method according to claim 4, further comprising:
adapting a value of the predetermined area threshold
depending on said at least one requirement parameter.

6. The method according to claim 4, wherein an adapta-
tion of said value of the area threshold corresponds to an
increase with respect to a default value of said area threshold
when said at least one requirement parameter is represen-
tative of a requirement of the flight management system
corresponding to a computational-, or memory-, or both
resource capacity of the flight management system or to the
decrease in journey time.

7. The method according to claim 1, wherein at least one
weather-severity level corresponds to an impact relating to
a safety of the aircraft, or
    wherein at least one weather-severity level corresponds to
    an impact relating to a performance of the aircraft,
    or both.

8. The method according to claim 1, wherein the polygo-
nising step is carried out using a maximum distance depen-
dent on a calibration parameter corresponding to one of said
at least one requirement parameter.

9. The method according to claim 8, further comprising:
increasing with respect to a default value said maximum
distance, when said at least one requirement parameter
is representative of a requirement of the flight manage-
ment system corresponding to a computational-, or
memory-, or both resource capacity of the flight man-
agement system,
decreasing with respect to a default value said maximum
distance, when said at least one requirement parameter
is representative of a requirement of the flight manage-
ment system corresponding to the decrease in journey
time or to a decrease in a fuel consumption and in an
environmental impact.

10. The method according to claim 1, further comprising:
providing the descriptors of the meteorological obstacles
to a display of the aircraft.

11. An avionics system configured to be located on board
an aircraft, the avionic system comprising:
    a flight management system; and,
    a weather data system, wherein the flight management system is configured to
transmit to the weather data system, at least one
requirement parameter being representative of a
requirement of the flight management system,
wherein the weather data system comprises:
electronic circuitry configured to implement the following
steps:
receiving the at least one requirement parameter trans-
mitted by the flight management system;
obtaining georeferenced meteorological-obstacle data;
processing the georeferenced meteorological-obstacle
data in order to categorize a weather severity of meteo-
rological obstacles and to obtain two-dimensional
meteorological-obstacle images separated by weather-
severity level;
polygonising through outline simplification the meteoro-
logical obstacles of the two-dimensional images, for
each weather-severity level, in order to obtain polygons
representative of meteorological obstacles, and georef-
erencing the obtained polygons;
configuring the processing, the polygonising, or both,
depending on the at least one requirement parameter;
and
providing descriptors of meteorological obstacles to the
flight management system, the descriptors of meteoro-
logical obstacles describing the obtained georeferenced
polygons;
wherein the flight management system is further config-
ured to:
compute a computed path allowing meteorological
obstacles to be avoided by the aircraft; and
transmit the computed path to a guiding system of the
aircraft for guiding the aircraft according to the com-
puted path,
wherein the requirement of the flight management system
is representative of:
a computational resource of the flight management sys-
tem, or a memory resource capacity of the flight
management system, or both; or
a requirement of decreasing journey time, or flight time,
between a current position of the aircraft at a time of
computation of the computed path by the flight man-
agement system and a destination of the aircraft; or
a requirement in respect of fuel consumption and envi-
ronmental impact; or
any combination thereof.

12. An aircraft comprising:
the avionics system according to claim 11.

* * * * *